Oct. 17, 1933.  A. B. CASPER  1,931,102
OSCILLATORY JOINT
Filed Oct. 8, 1931
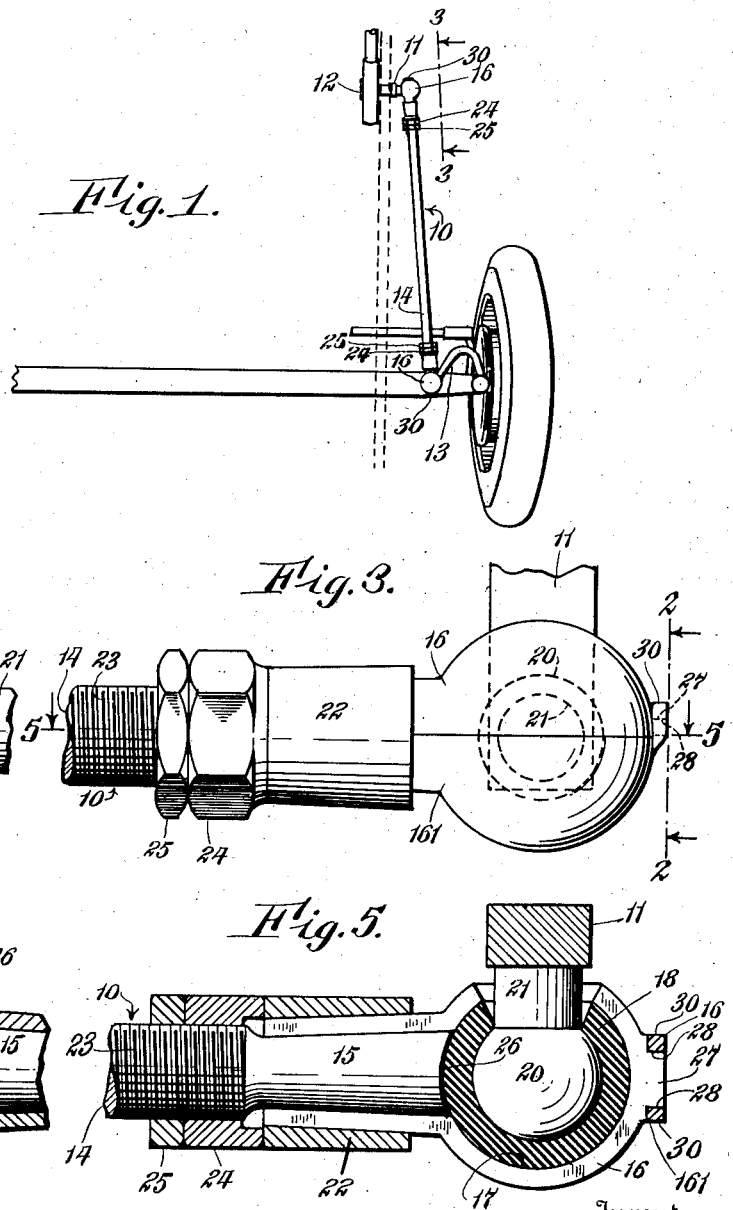

Patented Oct. 17, 1933

1,931,102

UNITED STATES PATENT OFFICE 1,931,102

OSCILLATORY JOINT

Anthony B. Casper, Buffalo, N. Y., assignor to Houde Engineering Corporation, Buffalo, N. Y., a corporation of New York Application October 8, 1931. Serial No. 567,544

16 Claims. (Cl. 287—90)

This invention relates to an oscillatory joint and more particularly to a ball and socket joint at the one end of a relatively long link such as is customarily employed in the steering mechanism linkage of an automobile.

The principal object of the invention is to produce an inexpensive and rattle proof joint of this character in which the parts are held very firmly in their respective positions and are not likely to become displaced by the incessant and violent vibration to which an automobile chassis is subjected. Numerous other objects of the invention and practical solutions thereof are disclosed in detail in the herein patent specification wherein:

In the accompanying drawing,

Figure 1 is a partially diagrammatic, diminutive, fragmentary top plan of the front part of an automobile showing the oscillatory joint applied to the steering linkage of the front wheels of said automobile.

Figure 2 is a fragmentary end elevation of the oscillatory joint taken on line 2—2, Fig. 3.

Figure 3 is a fragmentary side elevation thereof taken on line 3—3, Fig. 1.

Figure 4 is a vertical, transverse section through the oscillatory joint taken on line 4—4, Fig. 2.

Figure 5 is a longitudinal, medial section through said oscillatory joint taken on line 5—5, Fig. 3.

In the following description similar characters of reference indicate like parts in the several figures of the drawing.

My invention may be embodied in various forms and in oscillatory joints of different constructions, and the present application is therefore to be regarded merely as one organization which satisfactorily carries out the invention in practice. As here shown, the same is constructed as follows:

The oscillatory joint which constitutes the present invention comprises a ball and socket joint at each end of a steering link 10. This steering link 10 forms a part of the steering mechanism of an automobile, connecting the steering arm 11, pivoted to the automobile at 12, with the steering knuckle arm 13, in a manner well known in the art and not requiring further explanation here. Said steering link 10 chiefly comprises a tie rod 14 the rear end of which is connected by a ball and socket joint to said steering arm 11, and the front end to said steering knuckle arm 13, said joint being constructed in accordance with the present invention in the following manner:

Each of the extreme outer ends of said steering link 10 is provided (preferably integrally) with a tapered securing head 15, the same being tapered with the diameter of its larger tapered end substantially equal to or less than the diameter of the main body of said link, and the diameter of its smaller tapered end being somewhat smaller than the diameter of the main body of said link. Encircling said tapered securing head 15 is a shell comprising a plurality of sections 16 and 161 together forming a neck the annular bore of which is tapered to correspond with the external taper of said tapered securing head 15. The other ends of said sections are somewhat enlarged together forming a spherical socket 17 embracing a hollow spherical bushing 18 constructed of rubber or other like resilient material. The outer and inner annular spherical surfaces of said resilient bushing are concentric, and within the spherical interior of said bushing is received a spherical pivot head 20 which is preferably constructed of metal. This pivot head 20 is provided with a neck 21 which connects (integrally or otherwise) said spherical pivot head with the lower end of the steering arm 11 or inner end of the steering knuckle arm 13 as the case may be.

Encircling the neck portions of said sections 16 and 161 is a jam ring 22 of frustro-conical cylindrical form, the tapered bore of which bears against the tapered peripheries of said sections, so that, when said jam ring is moved longitudinally outward relatively to said sections 16, 161, the latter are forced tightly together or toward each other and firmly embrace the aforesaid hollow, spherical, resilient bushing 18. Inwardly of the tapered securing head 15, the tie rod 14 is provided with an external screw thread 23, engaging with which is the internal screw thread of a jam nut 24 which is adapted to be screwed tightly against the inner end of the jam ring 22 and to force the latter up the conical slope of the sections 16, 161. To prevent vibration from loosening said jam nut 24, a lock nut 25 is also preferably provided which is screwed up hard against the outer end of said jam nut after the latter has been tightly screwed into place.

It will be noticed that the extreme end face 26 of the securing head 15 is of concave spherical shape which is concentric with respect to the center of the pivot head 20 and is spherically flush with the inner surface of said socket 17 of the sections 16, 161. This arrangement provides a solid and continuous backing or closed container for the hollow spherical resilient bushing 18.

In addition to clamping the sections 16, 161 together at a point interiorly of the pivot head 20, it is preferred that said sections be also secured together exteriorly of said pivot head. The method of accomplishing this additional strength, as illustrated in the drawing, is the provision of a locking tongue 27 at the central outer end of the one section 16, said tongue being snugly received within a securing aperture 28 formed in a flange 30 which projects circumferentially up from the central outer part of the companion section 161. It is to be understood that the two sections 16 and 161 are assembled together and the tongue 27 of the one section 16 passed into the aperture 28 of the other section 161, prior to the slipping into place and clamping of the jam ring 22.

I claim:

1. An oscillatory joint connecting two relatively movable members, comprising a shell including a socket provided with an opening thereinto, said shell comprising two sections fitted about the end portion of one of said members and tapering from said socket toward said member, a resilient bushing in said socket, a stud connected to the other of said movable members, said stud including a head disposed within said socket and frictionally engaged by said bushing, said bushing permitting movement between said stud and said socket by reason of a flow of the material of the bushing, means for securing said shell to said first member including a non-expansible tapered sleeve, and means to force said sleeve longitudinally of said shell to interlock the shell with said end portion of said first member, said means being adjustable to increase the pressure of said socket on said bushing without changing the combined length of said shell and the first said member.

2. An oscillatory joint connecting two relatively movable members, comprising a ball stud connected to one of said members, a socket connected to the other of said members including a tapered end portion and receiving said ball stud, a resilient bushing snugly received in said socket and snugly fitting said ball stud, said socket comprising two separable sections including tapering necks extending about the tapered end portion of said other member, a collar disposed about said necks and means on the last said member for urging said collar toward said socket to cause said socket to more firmly grip said bushing and ball stud, and to interlock said tapering necks with said tapered end portion.

3. An oscillatory joint connecting two relatively movable members, comprising a ball stud connected to one of said members, a socket connected to the other of said members including a tapered end portion and receiving said ball stud, a resilient bushing snugly received in said socket and snugly fitting said ball stud, said socket consisting of sections including tapering necks extending about the tapered end portion of the other member, a collar having a frusto conical bore fitting about said necks, and a nut threadable on said other member for urging said collar toward said socket to cause said socket to more firmly grip said bushing and ball stud, and to firmly interlock said necks with said tapered end portion.

4. An oscillatory joint connecting two relatively movable members comprising a ball stud secured to one of said members, a tapered end portion on the other member, a socket unit for receiving said ball stud, said socket unit comprising two sections having necks extending about the other of said members, said neck sections tapering from said socket toward said other member and disposed about the tapered end portion thereof, a collar having a frusto conical bore slidable on said neck portions of said sections and means on said other member for urging said collar toward said socket to cause said socket to more firmly grip said ball stud and to cause the tapered necks to interlock with said tapered end portion.

5. In a device of the class described, a link including a frusto conical end portion of larger diameter toward the end, a shell comprising a plurality of sections together defining a spherical socket at one end and a hollow tapered neck extending from adjacent said socket toward the other end and decreasing in diameter from the socket, said neck being fitted on said end portion of the link such that the end of the link is disposed spherically flush with the inner surface of said socket, a non-expansible sleeve on said neck, and means on said link forcibly urging said sleeve longitudinally of said neck for interlocking said neck with said end portion.

6. In a device of the class described, a link including a frusto conical end portion of larger diameter toward the end, a shell comprising a plurality of sections together defining a spherical socket at one end and a hollow tapered neck extending from adjacent said socket toward the other end and decreasing in diameter from the socket, said neck being fitted on said end portion of the link such that the end of the link is disposed spherically flush with the inner surface of said socket, and a non-expansible sleeve on said neck for retaining said neck interlocked with said end portion.

7. In a device of the class described, a link including a frusto conical end portion of larger diameter toward the end, a shell comprising a plurality of sections together defining spherical socket at one end and a hollow tapered neck extending from adjacent said socket toward the other end and decreasing in diameter from the socket, said neck being fitted on said end portion of the link, a non-expansible sleeve on said neck, and means on said link forcibly urging said sleeve longitudinally of said neck for interlocking said neck with said end portion.

8. In a device of the class described, a link including a frusto conical end portion of larger diameter toward the end, a shell comprising a plurality of sections together defining a spherical socket at one end and a hollow tapered neck extending from adjacent said socket toward the other end and decreasing in diameter from the socket, said neck being fitted on said end portion of the link, and a non-expansible sleeve on said neck for retaining said neck interlocked with said end portion.

9. In a device of the class described, a link including a tapered end portion of larger diameter toward the end, a longitudinally divided shell comprising a plurality of sections together forming a socket at one end and a hollow tapered neck of smaller diameter toward the other end, said neck being fitted over the tapered end portion of said link, and non-expansible means forcibly holding the neck interlocked with said end portion.

10. In a device of the class described, a link including a tapered end portion of larger diameter toward the end, a longitudinally divided shell comprising a plurality of sections together forming a socket at one end and a hollow tapered neck of smaller diameter toward the other end, said neck being fitted over the tapered end portion of said link, and non-expansible means forcibly holding the neck interlocked with said end portion, and means on said link adapted to change the force exerted by said non-expansible means without changing the combined length of said shell and link.

11. In a device of the class described, a link including a tapered end portion of larger diameter toward the end, a longitudinally divided shell comprising a plurality of sections together forming a socket at one end and a hollow tapered neck of smaller diameter toward the other end, said neck being fitted over the tapered end portion of said link such that the end of the link is disposed spherically flush with the inner surface of said socket, and non-expansible means forcibly holding the neck interlocked with said end portion.

12. In a device of the class described, a link including a tapered end portion of larger diameter toward the end, a longitudinally divided shell comprising a plurality of sections together forming a socket at one end and a hollow tapered neck of smaller diameter toward the other end, said neck being fitted over the tapered end portion of said link such that the end of the link is disposed spherically flush with the inner surface of said socket, and non-expansible means forcibly holding the neck interlocked with said end portion and means on said link adapted to change the force exerted by said non-expansible means without changing the combined length of said shell and link.

13. In a device of the class described, a shell hollow throughout its length and comprising a plurality of separable sections together forming a tapered neck at one end and a socket at the other end, said neck being of larger diameter toward the socket, a link including a tapered end portion disposed within said neck and adapted to interlock with said neck, and means clampingly holding the neck in firm engagement with the end portion of said link.

14. In a device of the class described, a shell hollow throughout its length and comprising a plurality of separable sections together forming a tapered neck at one end and a socket at the other end, said neck being of larger diameter toward the socket, a link including a tapered end portion disposed within said neck and adapted to interlock with said neck, and means clampingly holding the neck in firm engagement with the end portion of said link and adjustable locking means for the first said means to adjust the clamping force on said neck without changing the combined length of said shell and said link.

15. In a device of the class described, a shell hollow throughout its length and comprising a plurality of separable sections together forming a tapered neck at one end and a socket at the other end, said neck being of larger diameter toward the socket, a link including a tapered end portion disposed within said neck such that the end of the link is disposed spherically flush with the inner surface of said socket, and adapted to interlock with said neck, and means clampingly holding the neck in firm engagement with the end portion of said link.

16. In a device of the class described, a shell hollow throughout its length and comprising a plurality of separable sections together forming a tapered neck at one end and a socket at the other end, said neck being of larger diameter toward the socket, a link including a tapered end portion disposed within said neck such that the end of the link is disposed spherically flush with the inner surface of said socket, and adapted to interlock with said neck, and means clampingly holding the neck in firm engagement with the end portion of said link and adjustable locking means for the first said means to adjust the clamping force on said neck without changing the combined length of said shell and said link.

ANTHONY B. CASPER.